(12) United States Patent
Herrault et al.

(10) Patent No.: US 11,029,387 B2
(45) Date of Patent: Jun. 8, 2021

(54) RADAR SYSTEM WITH FREQUENCY CONVERSION AND CORRESPONDING METHOD

(71) Applicant: GM Global Technology Operations LLC, Detroit, MI (US)

(72) Inventors: Florian G. Herrault, Agoura Hills, CA (US); Hasan Sharifi, Agoura Hills, CA (US); Robert G. Nagele, Thousand Oaks, CA (US); Igal Bilik, Rehovot (IL)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 16/220,482

(22) Filed: Dec. 14, 2018

(65) Prior Publication Data
US 2020/0191902 A1  Jun. 18, 2020

(51) Int. Cl.
*G01S 7/03* (2006.01)
*G01S 7/282* (2006.01)
(Continued)

(52) U.S. Cl.
CPC .............. *G01S 7/032* (2013.01); *G01S 7/282* (2013.01); *G01S 7/285* (2013.01); *G01S 13/931* (2013.01);
(Continued)

(58) Field of Classification Search
CPC .......... G01S 7/032; G01S 7/282; G01S 7/285; G01S 13/931; G01S 2013/93185;
(Continued)

(56) References Cited

U.S. PATENT DOCUMENTS 6,052,086 A * 4/2000 Kudoh ................. H01Q 21/065
                                                            343/700 MS
9,335,406 B2 * 5/2016 Lohr ................... H04B 10/2575
(Continued)

OTHER PUBLICATIONS

Andrea Vallecchi and Guido Biffi Gentili, "Design of Dual-Polarized Series-Fed Microstrip Arrays With Low Losses and High Polarization Purity", IEEE Transactions on Antennas and Propagation, May 2005, p. 1791-1798, vol. 53, No. 5.
(Continued)

*Primary Examiner* — Frank J McGue
(74) *Attorney, Agent, or Firm* — Quinn IP Law

(57) ABSTRACT

A radar system with frequency conversion includes a signal generator configured to generate an input signal at a first frequency. A transmitting interposer is configured to receive the input signal from the signal generator. The transmitting interposer includes a transmitting front-end module configured to upconvert the input signal at the first frequency to an outgoing radar signal at a second frequency greater than the first frequency, and a transmitting antenna module having a plurality of transmitting patches configured to radiate the outgoing radar signal. A receiving interposer is configured to transmit an output signal to the signal generator. The receiving interposer includes a receiving antenna module having a plurality of receiving patches configured to capture an incoming radar signal at the second frequency, and a receiving front-end module configured to downconvert the incoming radar signal at the second frequency to the output signal at the first frequency.

16 Claims, 4 Drawing Sheets

(51) Int. Cl.
  *G01S 7/285* (2006.01)
  *G01S 13/931* (2020.01)
  *H01Q 21/06* (2006.01)

(52) U.S. Cl.
  CPC .... *H01Q 21/065* (2013.01); *G01S 2013/9321* (2013.01); *G01S 2013/93185* (2020.01)

(58) Field of Classification Search
  CPC .......... G01S 2013/9321; H01Q 21/065; H01Q 21/0037; H01Q 1/3233
  USPC ........................................................ 342/175
  See application file for complete search history.

(56) References Cited

U.S. PATENT DOCUMENTS

| | | | | |
|---|---|---|---|---|
| 2002/0111149 A1* | 8/2002 | Shoki | ................... | H01Q 3/2605 455/277.1 |
| 2014/0022119 A1* | 1/2014 | Lohr | ................... | G01S 13/02 342/25 R |
| 2015/0210387 A1* | 7/2015 | Ling | ................... | G05D 1/0022 701/2 |
| 2016/0143033 A1* | 5/2016 | Falkenstein, Jr. | ........ | H04B 7/15 370/338 |
| 2019/0386665 A1* | 12/2019 | Shalita | ................... | G01S 7/03 |

OTHER PUBLICATIONS

Duixian Liu, Johannes A. G. Akkermans, Ho-Chung Chen, and Brian Floyd, "Packages With Integrated 60-GHz Aperture-Coupled Patch Antennas", IEEE Transactions on Antennas and Propagation, Oct. 2011, p. 3607-3616, vol. 59, No. 10.

D. M. Pozar, "Microstrip Antenna Aperturecoupled to a Microstripline", Department of Electrical & Computer Engineering, University of Massachusetts, Amherst, MA 01003, USA, Nov. 19, 1984, Electronics Letters, vol. 21 No. 2.

Ingela Nystrom and Dan Karlsson, "Reduction Of Back .Radiation And Cross-Coupling In Dual Polarized Aperture Coupled Patch Antennas", IEEE, Sweden, p. 2222-2225,1997.

http://www.statschippac.com/~/media/Files/DocLibrary/brochures/STATS_ChipPAC_SiP.ashx, "System-in-Packge (SIP) Solutions", accessed Dec. 6, 2018.

* cited by examiner

RADAR SYSTEM WITH FREQUENCY CONVERSION AND CORRESPONDING METHOD

INTRODUCTION

The present disclosure relates in general to a radar system with frequency conversion and corresponding method. A radar detection system transmits radio waves that reflect off various objects and parts of the terrain. As the radiation returns to the radar system, various information about the object, such as distance, direction and speed, is obtained. Automotive devices may employ radar for multiple purposes, including but not limited to, adaptive cruise control, lane changing assistance, and automatic braking.

SUMMARY

Disclosed herein is a radar system with frequency conversion and a corresponding method of controlling the radar system. The radar system includes at least one signal generator configured to generate an input signal at a first frequency. The system includes a transmitting interposer configured to receive the input signal from the signal generator and a receiving interposer configured to transmit an output signal to the signal generator. The transmitting interposer includes a transmitting front-end module configured to upconvert the input signal at the first frequency to an outgoing radar signal at a second frequency, the second frequency being greater than the first frequency. The transmitting interposer includes a transmitting antenna module having a plurality of transmitting patches configured to radiate the outgoing radar signal.

The receiving interposer includes a receiving antenna module having a plurality of receiving patches configured to capture an incoming radar signal at the second frequency, and a receiving front-end module configured to downconvert the incoming radar signal at the second frequency to the output signal at the first frequency. In one example, the first frequency is between 20 GHz and 100 GHz and the second frequency is between 70 GHz and 300 GHz. In another example, the first frequency is between 70 GHz and 80 GHz, while the second frequency is between 210 GHz and 240 GHz. The second frequency may be an integer multiple of the first frequency.

The transmitting front end module may include a first local oscillator configured to a produce a first local frequency. A first frequency mixer may be configured to produce a sum frequency and a difference frequency. In one example, the first frequency mixer is a harmonic mixer configured to produce the sum frequency and the difference frequency at a harmonic multiple of at least one of the first local frequency and the first frequency of the input signal. A first filter may be configured to remove at least one of the sum frequency and the difference frequency. The receiving front end module may include a second local oscillator configured to produce a second local frequency. A second frequency mixer may be configured to produce a sum frequency and a difference frequency from the second local frequency and the second frequency of the incoming radar signal. A second filter may be configured to remove at least one of the sum frequency and the difference frequency.

The base board may include a base layer configured to have a transmission capacity in at least a radiofrequency range, and a base ground layer co-extensive with the base layer. The transmitting interposer may include a transmitting substrate and a transmitting ground layer co-extensive with the transmitting substrate, a dielectric layer adjacent to the transmitting ground layer, and a feed line adjacent to the dielectric layer. A plurality of interconnects, including but not limited to conducting pillars, solder balls and bumps, may be configured to operatively connect the transmitting interposer and the base board. The plurality of interconnects may be configured to directly connect the transmitting ground layer and the base ground layer. The plurality of transmitting patches of the transmitting antenna module may be positioned on the first side of the at least one transmitting interposer and the transmitting front-end module may be positioned on a second side of the at least one transmitting interposer. The transmitting ground layer may include a respective aperture coupled to a respective one of the plurality of transmitting patches.

The signal generator may be positioned between the transmitting interposer and the receiving interposer. The receiving interposer may include a receiving substrate, a receiving ground layer co-extensive with receiving substrate, and a dielectric layer adjacent to the receiving ground layer. The plurality of receiving patches of the receiving antenna module may be positioned on a first side of the receiving interposer and the receiving front-end module may be positioned on a second side of the at least one receiving interposer. The receiving ground layer may include a respective aperture coupled to a respective one of the plurality of receiving patches.

In another embodiment, the radar system includes a base board with a plurality of signal generators operatively connected to the base board. The signal generators are configured to generate respective input signals at a first frequency. A plurality of transmitting interposers is operatively connected to the base board and configured to receive the respective input signals. The plurality of transmitting interposers each include multiple respective transmitting front-end modules configured to upconvert the respective input signals at the first frequency to respective outgoing radar signals at a second frequency.

Additionally, the plurality of transmitting interposers each include multiple respective transmitting antenna modules having a respective plurality of transmitting patches configured to radiate the respective outgoing radar signals at the second frequency. A single receiving interposer is operatively connected to the base board and configured to transmit respective output signals to the plurality of signal generators. The single receiving interposer includes multiple receiving antenna modules having a respective plurality of receiving patches configured to capture respective incoming radar signals at the second frequency, and a single receiving front-end module configured to downconvert the respective incoming radar signals at the second frequency to the respective output signals at the first frequency.

The above features and advantages and other features and advantages of the present disclosure are readily apparent from the following detailed description of the best modes for carrying out the disclosure when taken in connection with the accompanying drawings.

DETAILED DESCRIPTION

Figure 1:
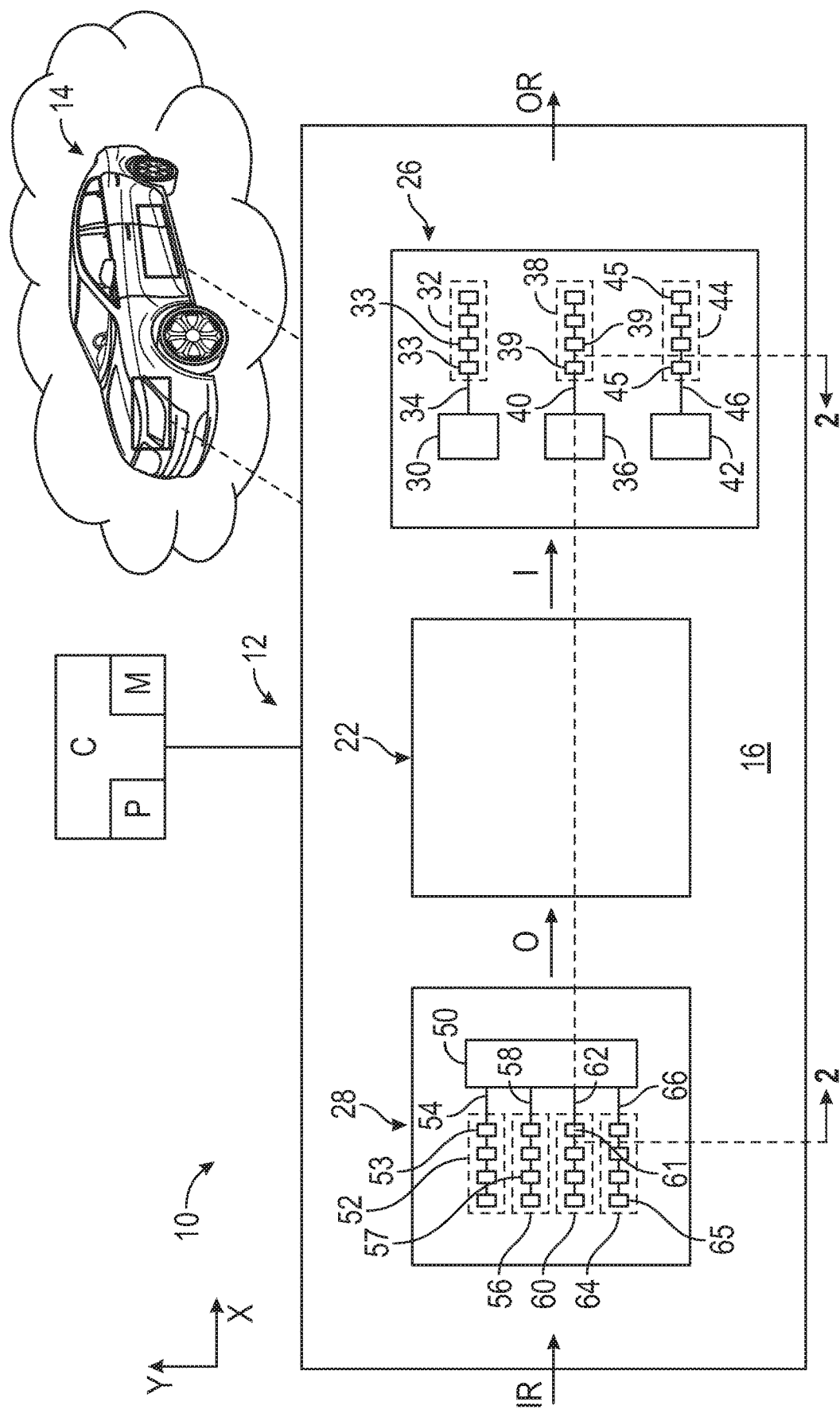
FIG. 1 is a schematic top view of an example radar system with a radar module mountable on a device, in accordance with a first embodiment.

Referring to the drawings, wherein like reference numbers refer to like components, FIG. 1 schematically illustrates a radar system 10 having a radar module 12 mountable on a device 14. Depending on the application at hand, the radar module 12 may be attached, embedded, or otherwise connected to a front, rear, side or other suitable portion of the device 14. The device 14 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation device. The device 14 may take many different forms and include multiple and/or alternate components and facilities.

Referring to FIG. 1, a controller C may be in communication with the radar module 12. The controller C includes at least one processor P and at least one memory M (or non-transitory, tangible computer readable storage medium) on which instructions may be recorded for executing various programs. The memory M can store controller-executable instruction sets, and the processor P can execute the controller-executable instruction sets stored in the memory M. The controller C may be embedded or otherwise integrated with the radar module 12. Alternatively, the controller C may be a separate unit from the radar module 12. As described below, the radar system 10 enables implementation of a relatively high operating frequency, such as for example frequencies above 100 Hz, in a structure that may be fabricated efficiently at low cost.

Figure 2:
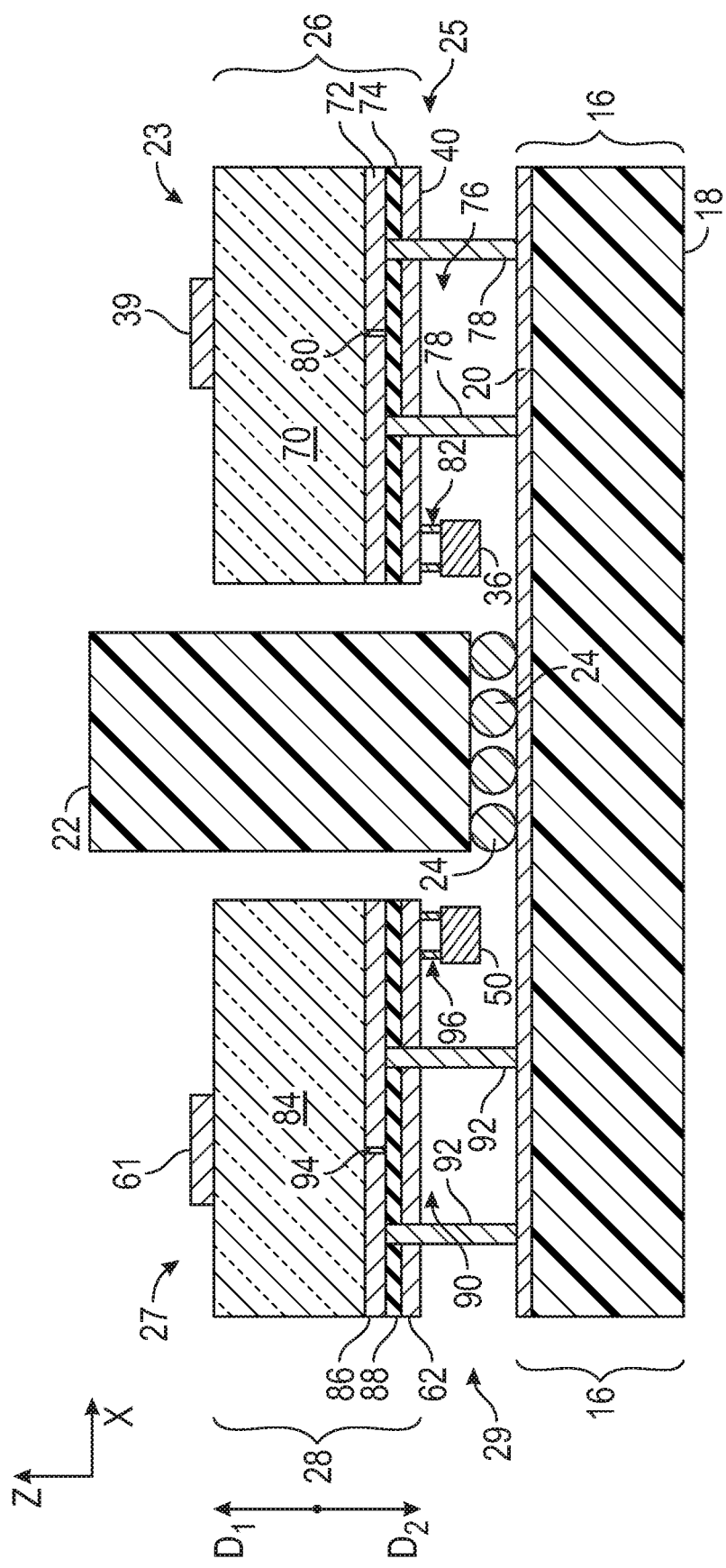
FIG. 2 is a schematic fragmentary partly sectional view through axis 2-2 of the radar module of FIG. 1.

FIG. 2 is a schematic fragmentary partly sectional view through axis 2-2 of the radar module 12. Referring to FIG. 2, the radar module 12 includes a base board 16 (also shown in FIG. 1) having a base layer 18 and a ground layer 20. In one example, the base layer 18 is a printed circuit board (PCB) with transmission capacity in at least the radiofrequency range. Referring to FIGS. 1 and 2, at least one signal generator 22 ("at least one" omitted henceforth) is configured to generate an input signal I (see FIG. 1) at a first frequency. The number and size of the signal generator 22 may be varied based on the application at hand. Referring to FIG. 2, the signal generator 22 may be connected to the base board 16 through a conductive medium, such as solder balls 24. The signal generator 22 may be an integrated single-chip frequency-modulated continuous-wave (FMCW) transceiver. In a non-limiting example, the signal generator 22 may be configured for operation in the 76 GHz to 81 GHz frequency band.

Referring to FIGS. 1 and 2, the radar module 12 includes at least one transmitting interposer 26 and at least one receiving interposer 28 operatively connected to the base board 16. Referring to FIG. 1, the transmitting interposer 26 is configured to receive an input signal I from the signal generator 22 and the receiving interposer 28 is configured to transmit an output signal O to the signal generator 22. The transmitting interposer 26 is configured to radiate an outgoing radar signal ("OR" in FIG. 1) which is reflected from a target and returns back as an incoming radar signal ("IR" in FIG. 1) captured by the receiving interposer 28. The outgoing radar signal OR may be a linearly increasing frequency change for a short duration which may be repeated in a specific pattern. By separating the transmitting interposer 26 and the receiving interposer 28, electromagnetic coupling is minimized, thereby improving the transmission to reception isolation of the radar system 10. The controller C may be configured to control operation of the signal generator 22, the transmitting interposer 26 and the receiving interposer 28.

Referring to FIGS. 1 and 2, the transmitting interposer 26 includes at least one transmitting front-end module 30, configured to upconvert the input signal I at the first frequency to an outgoing radar signal OR at a second frequency. The second frequency may be a multiple of the first frequency. In one example, the first frequency is between 20 GHz and 100 GHz and the second frequency is between 70 GHz and 300 GHz. In another example, the first frequency is between 70 GHz and 80 GHz, and the second frequency is between 210 GHz and 240 GHz. In another example, the first frequency is about 77 GHz and the second frequency is about 234 GHz. The second frequency may be greater than the first frequency by a multiplicative factor.

Referring to FIG. 1, the transmitting front-end module 30 is in communication with a transmitting antenna module 32 having a plurality of transmitting patches 33 configured to radiate the outgoing radar signal OR. In the embodiment shown, there are two additional transmitting front-end modules, each in communication with a respective transmitting antenna module. Referring to FIG. 1, a second transmitting front-end module 36 is in communication with a second transmitting antenna module 38 having a respective plurality of transmitting patches 39 (one shown in cross-section in FIG. 2), via a second feed line 40. A third transmitting front-end module 42 is in communication with a third transmitting antenna module 44 having a respective plurality of transmitting patches 45, via a third feed line 46. As described below, the respective transmitting antenna modules 32, 38, 44 are configured to be excited by the respective feed lines 34, 40, 46. The number of transmitting front-end modules and respective transmitting patches may be varied based on the application at hand. In the embodiment shown in FIG. 1, each of the front end transmitting modules 30, 36, 42 carries a respective signal transmit channel, with each of the channels being located on a single transmit interposer 26.

Referring to FIG. 1, the receiving interposer 28 includes a receiving front-end module 50 in communication with one or more receiving antenna modules, such as first receiving antenna module 52, second receiving antenna module 56, third receiving antenna module 60 and fourth receiving antenna module 64. In other words, the receiving front-end module 50 is connected to multiple receiving antenna modules. Referring to FIG. 1, the first, second, third and fourth receiving antenna modules 52, 56, 60, 64 include a respective plurality of receiving patches 53, 57, 61, 65 configured to capture an incoming radar signal IR at the second frequency. The number of receiving antenna modules and receiving patches may be varied based on the application at hand. In the example shown, there are four receiving antenna modules with four receiving patches each, providing a total of 16 receive channels. A different number of channels per receiving interposer may be chosen to improve yield. In one example, the receiving front end module 50 is configured to receive energy at or above 100 GHz.

Referring to FIG. 1, the receiving front-end module 50 is configured to downconvert the incoming radar signal IR at the second frequency to the output signal O at the first frequency. The first, second, third and fourth receiving antenna modules 52, 56 60, 64 are connected to an input port (not shown) of the receiving front-end module 50 via respective first, second, third and fourth feed lines 54, 58, 62 and 66. Referring to FIG. 1, the plurality of receiving patches 53, 57, 61, 65 in the elevation plane (X axis in FIG. 1), may be spaced approximately half a wavelength apart (of the second frequency), to produce a directive elevation beam. For scale, half a wavelength at 234 GHz is approximately 0.6 mm. The plurality of receiving patches 53, 57, 61, 65 may be spaced approximately half a wavelength apart (of the second frequency) in the azimuth plane (Y axis in FIG. 1). The spacing may be varied according to the application at hand. On the transmitting side, the transmitting patch elements 33, 39, 45 may be spaced further apart than half a wavelength to increase angular resolution. By having separate transmitting front-end modules 30, 36, 42 for each channel, the spacing between the plurality of transmitting patches 33, 39, 45 may be modified without changing the transmitting interposer 26.

Referring to FIG. 2, the transmitting interposer 26 may include a transmitting substrate 70 co-extensive with a transmitting ground layer 72, and a dielectric layer 74 adjacent to the transmitting ground layer 72. The transmitting substrate 70 may be composed of a material with sufficient smoothness and hardness that allows circuitry with relatively small features, such as for example, less than 10 um, to be realized with relatively tight tolerances. In one example, the transmitting substrate 70 is composed of silicon. In another example, the transmitting substrate 70 is composed of ceramic or glass. The dielectric layer 74 serves as a redistribution layer enabling the respective transmitting antenna modules 32, 38, 44 to be excited by the respective feed lines 34, 40, 46. In one example, the dielectric layer 74 is composed of a polymer, such as benzocyclobutene.

Referring to FIG. 2, the transmitting interposer 26 defines a first side 23 and an opposing second side 25. The plurality of transmitting patches 39 may be positioned on the first side 23 of the transmitting interposer 26 and the second transmitting front-end module 36 (and second feed line 40) may be positioned on the second side 25 of the transmitting interposer 26. This provides an advantage that heat may be drawn away from the transmitting front-end module 36 (and other transmitting front-end modules 36, 42) to the base board 16 and dissipated elsewhere.

Referring to FIG. 2, a plurality of interconnects 78, including but not limited to conducting pillars, solder balls and bumps, is configured to operatively connect the transmitting interposer 26 and the base board 16. The plurality of interconnects 78 may directly connect the transmitting ground layer 72 and the base ground layer 20 of the base board 16, forming a cavity 76. Each of the plurality of transmitting patches 33, 39, 45 of FIG. may be coupled to a respective aperture. Referring to FIG. 2, the transmitting ground layer 72 includes an aperture 80 coupled to a respective one of the plurality of transmitting patches, such as patch 39 shown in FIG. 2. When the aperture 80 is excited by the second feed line 40, the aperture 80 radiates in both a forward direction D1 and a reverse direction D2. Referring to FIG. 2, the radiation in the reverse direction D2 may be blocked by the cavity 76 formed by the plurality of interconnects 78. Referring to FIG. 2, the second transmitting front-end module 36 may be in communication with the second feed line 40 via conductive contacts 82.

Referring to FIG. 2, the receiving interposer 28 may include a receiving substrate 84, a receiving ground layer 86 coextensive with the receiving substrate 84, and a dielectric layer 88 adjacent to the receiving ground layer 86. A plurality of interconnects 92 is configured to operatively connect the receiving substrate 84 and the base board 16. Referring to FIG. 2, the plurality of interconnects 92 may directly connect the receiving ground layer 86 and the ground layer 20 of the base board 16, forming a cavity 90. Each of the plurality of receiving patches 53, 57, 61, 65 of FIG. 1 may be coupled to a respective aperture. Referring to FIG. 2, the receiving ground layer 86 includes an aperture 94 coupled to the receiving patch 61. Referring to FIG. 2, the receiving front-end module 50 is in communication with the third feed line 62 via conductive contacts 96. Referring to FIG. 2, the receiving interposer 28 defines a first side 27 and an opposing second side 29. The plurality of receiving patches 53, 57, 61, 65 (see receiving patch 61 in FIG. 2) may be positioned on the first side 27 of the receiving interposer 28 and the receiving front-end module 50 (and third feed line 62) may be positioned on the second side 29. This provides an advantage that heat may be drawn away from the receiving front-end module 50 (and other front-end modules) to the base board 16 and dissipated elsewhere.

Figure 3:
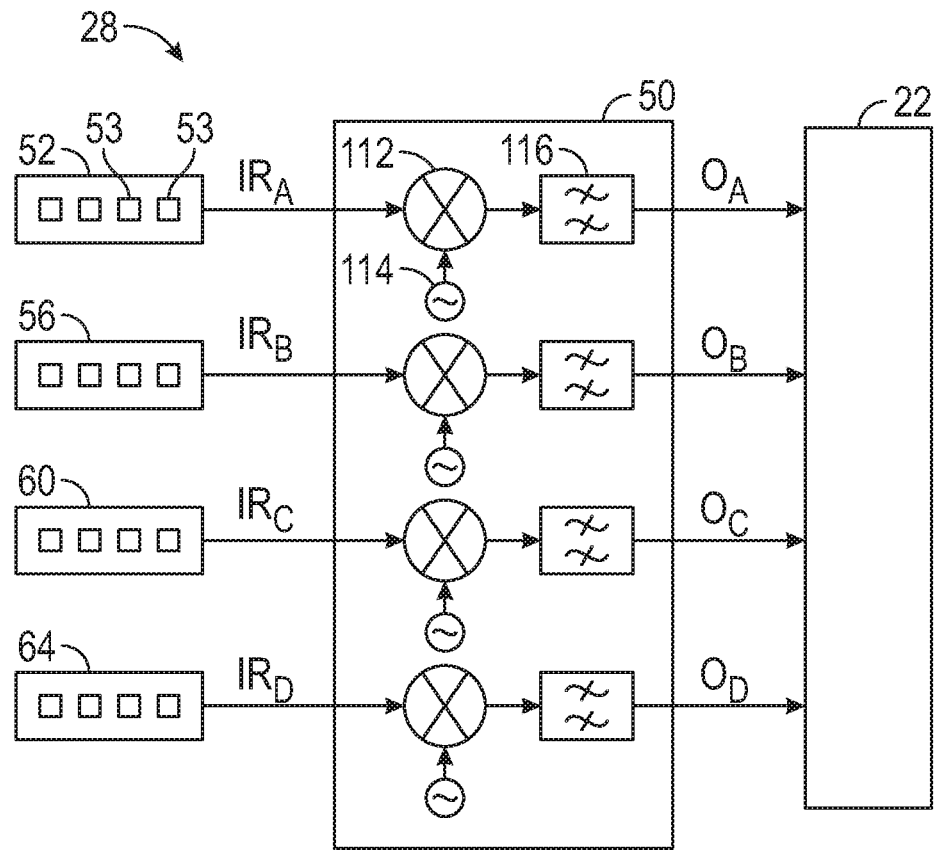
FIG. 3 is a schematic diagram of an example configuration for a receiving front-end module employable in the radar module of FIG. 1.
Figure 4:
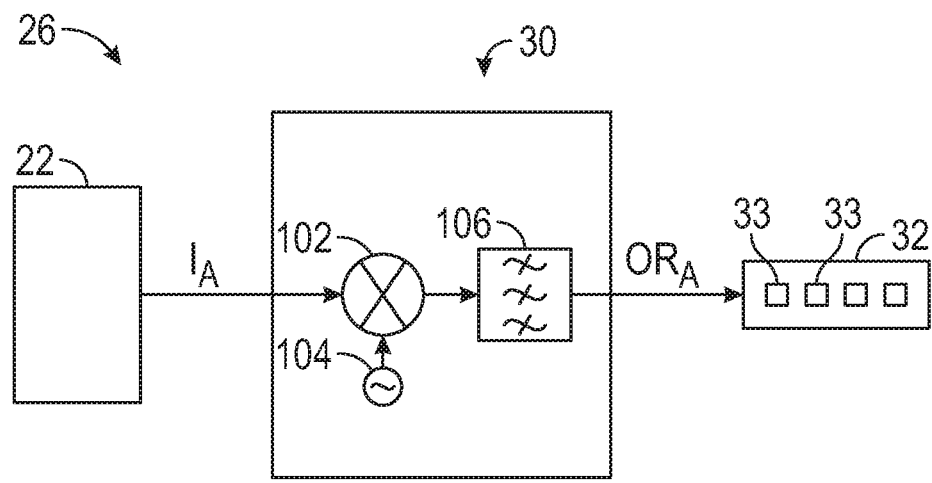
FIG. 4 is a schematic diagram of an example configuration for a transmitting front-end module employable in the radar module of FIG. 1.

Referring now to FIG. 3, a schematic diagram of an example configuration for a receiving front-end module 50 employable in the radar module 12 is shown. FIG. 4 is a schematic diagram of an example configuration for a transmitting front-end module 30 employable in the radar module 12 of FIG. 1. It is to be understood that the examples presented herein are non-limiting examples and alternative configurations may be employed. Additionally, the transmitting front-end module 30 and the receiving front end module 50 may include other elements of circuitry not shown in FIGS. 3 and 4.

Referring to FIG. 3, the receiving front end module 50 is configured to receive respective incoming radar signals $IR_A$, $IR_B$, $IR_C$, $IR_D$, from the plurality of antenna modules 52, 56, 60, 64. The receiving front end module 50 is configured to transmit respective output signals $O_A$, $O_B$, $O_C$, $O_D$, to the signal generator 22. Referring to FIG. 3, the receiving front end module 50 of the receiving interposer 28 may include a second frequency mixer 112, a second local oscillator 114 and a second filter 116. The second local oscillator 114 is configured to a produce a second local frequency (LO2). The second frequency mixer 112 is configured to produce a sum frequency (LO2+F2) and a difference frequency (LO2−F2) from the second local frequency and the second frequency of the incoming radar signal. The second filter 116 is configured to remove at least one of the sum frequency and the difference frequency. Multiple mixers (not shown) may be employed with a single local oscillator to create an in-phase/quadrature (I/Q) demodulator, such that the local oscillator signals to each mixer differ in phase by 90 degrees.

Referring to FIG. 4, the signal generator 22 is configured to deliver an input signal $I_A$ to the transmitting front-end module 30, which sends out an outgoing radar signal $OR_A$ to the transmitting antenna module 32. The second front-end module 36 and third front-end module 42 are not shown and may include similar components. An amplifier (not shown) may be employed to boost the amplitude of the input signal $I_A$. Referring to FIG. 4, the transmitting front-end module 30 of the transmitting interposer 26 may include a first frequency mixer 102, a first local oscillator 104 and a first filter 106. The first local oscillator 104 is configured to a produce a first local frequency (LO1). In one example, the first frequency mixer 102 is a harmonic mixer configured to produce a sum frequency and a difference frequency at a harmonic multiple of at least one of the first local frequency (LO1) and the first frequency (F1) of the input signal $I_A$. A first filter 102 may be employed to remove at least one of the sum frequency and the difference frequency. Other types of electrical circuit may be employed.

Figure 5:
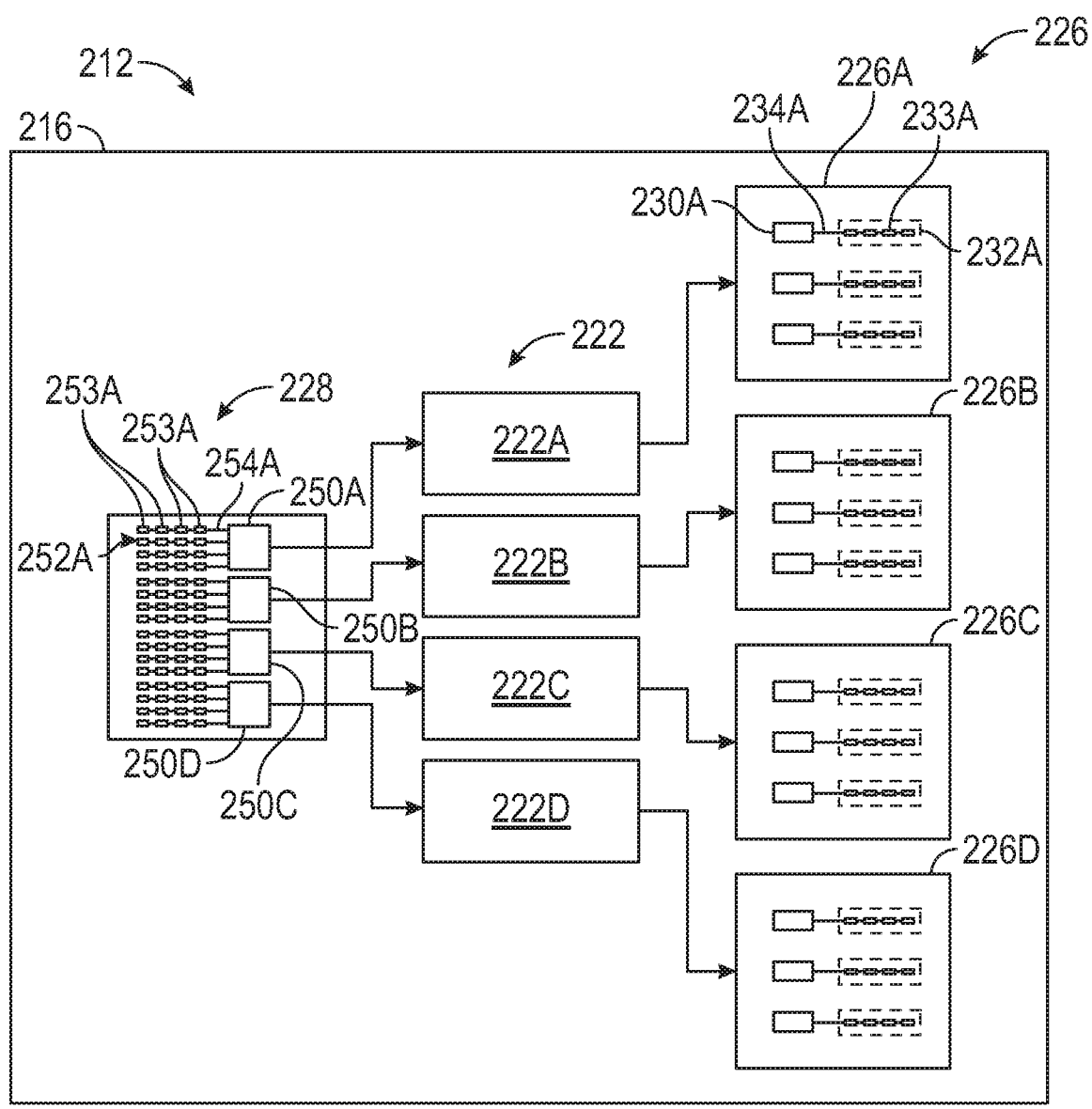
FIG. 5 is a schematic top view of another example radar module mountable on the device of FIG. 1, in accordance with a second embodiment.

Referring now to FIG. 5, a schematic top view of another example radar module 212 is shown. The radar module 212 is mountable on the device 14 of FIG. 1. The radar module 212 includes a plurality of signal generators 222, such as first signal generator 222A, second signal generator 222B, third signal generator 222C and fourth signal generator 222D, operatively connected to a base board 216. The plurality of signal generators 222 is configured to generate a respective input signal at a first frequency. Employing more synchronized signal generators increases the number of transmit and receive channels, thereby improving angular resolution. The connection between the plurality of signal generators 222 and the base board 216 may be made with the solder balls 24 shown in FIG. 2 or other attachment mechanisms available to those skilled in the art.

Referring to FIG. 5, the radar module 212 includes a plurality of transmitting interposers 226 (see transmitting interposers 226A, 226B, 226C and 226D in FIG. 5) operatively connected to the base board 216 and configured to receive respective input signals from the plurality of signal generators 222. The plurality of transmitting interposers each include respective transmitting front-end modules in communication with respective antenna modules. The plurality of transmitting front-end modules, such as transmitting front-end module 230A in FIG. 5, is configured to upconvert the respective input signal at the first frequency to a respective outgoing radar signal at a second frequency. The cascading effect of multiple transmitting interposers 226A, 226B, 226C and 226D enables greater angular resolution.

Referring to FIG. 5, the transmitting front-end module 230A is in communication with a respective transmitting antenna module 232A, via a respective feed line 234A. The respective transmitting antenna module 232A includes a respective plurality of transmitting patches 233A configured to radiate the outgoing radar signal at the second frequency. The second frequency is greater than the first frequency. In one example, the first frequency is between 20 GHz and 100 GHz and the second frequency is between 70 GHz and 300 GHz. In another example, the first frequency is between 70 GHz and 80 GHz, while the second frequency is between 210 GHz and 240 GHz. In another example, the first frequency is about 77 GHz and the second frequency is about 234 GHz.

Referring to FIG. 5, a single receiving interposer 228 is operatively connected to the base board 216 and configured to transmit respective output signals to the plurality of signal generators 222, as shown by the arrows. The single receiving interposer 228 includes a plurality of receiving front-end modules 250A, 250B, 250C and 250D, configured to downconvert the respective incoming radar signals at the second frequency to the respective output signals at the first frequency. As shown in FIG. 5, each of the plurality of receiving front-end modules 250A, 250B, 250C and 250D is in communication with multiple respective receiving antenna modules (such as receiving antenna module 252A) via a respective feed line (such as feed line 254A) having a respective plurality of receiving patches (such as receiving patches 253A) configured to capture respective incoming radar signals at the second frequency.

In summary, the radar system 10 integrates one or more signal generators 22, 222 that operate at a lower frequency together with front end modules (receiving and transmitting) operating at a higher frequency in a manner that enables low cost, high volume manufacturing of a relatively high-frequency radar, such as for example, a radar with an operating frequency at or above 100 GHz. Accordingly, the radar system 10 improves the functioning of the device 14. The radar system 10 eliminates through-interposer vias, resulting in lower manufacturing costs and greater efficiency. The radar system 10 provides a technical advantage when the operating frequency exceeds W band (110 GHz) because the tolerances required to achieve the appropriate radar sensor performance become tighter than what a base board 16, 216 having a radiofrequency (RF) printed circuit board may provide.

The controller C of FIG. 1 may be an integral portion of, or a separate module operatively connected to, other controllers of the device 14. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other characteristics from other embodiments, resulting in other embodiments not described in words or by reference to the drawings. Accordingly, such other embodiments fall within the framework of the scope of the appended claims.

What is claimed is:

1. A radar system comprising:
   a base board;
   at least one signal generator operatively connected to the base board and configured to generate an input signal at a first frequency, the first frequency being in a radiofrequency range;
   at least one transmitting interposer operatively connected to the base board and configured to receive the input signal from the at least one signal generator, the at least one transmitting interposer including:
      a transmitting front-end module configured to upconvert the input signal at the first frequency to an outgoing radar signal at a second frequency, the second frequency being greater than the first frequency; and
      a transmitting antenna module having a plurality of transmitting patches configured to radiate the outgoing radar signal;
   at least one receiving interposer operatively connected to the base board and configured to transmit an output signal to the at least one signal generator, the at least one receiving interposer including:
      a receiving antenna module having a plurality of receiving patches configured to capture an incoming radar signal at the second frequency; and
      a receiving front-end module configured to downconvert the incoming radar signal at the second frequency to the output signal at the first frequency, the first frequency being between 20 GHz and 100 GHz and the second frequency being between 60 GHz and 300 GHz; and
      wherein the at least one signal generator is positioned between the at least one transmitting interposer and the at least one receiving interposer.

2. The system of claim 1, wherein:
   the first frequency is between 70 GHz and 80 GHz and the second frequency is between 210 GHz and 240 GHz; and
   the second frequency is an integer multiple of the first frequency.

3. The system of claim 1, wherein the transmitting front end module includes:
   a first local oscillator configured to produce a first local frequency;
   a first frequency mixer configured to produce a sum frequency and a difference frequency of the first local frequency and the first frequency of the input signal; and
   a first filter configured to remove at least one of the sum frequency and the difference frequency.

4. The system of claim 1, wherein the receiving front end module includes:
   a second local oscillator configured to a produce a second local frequency;
   a second frequency mixer configured to produce a sum frequency and a difference frequency from the second local frequency and the second frequency of the incoming radar signal; and
   a second filter configured to remove at least one of the sum frequency and the difference frequency.

5. The system of claim 1, wherein:
   the base board includes a base layer configured to have a transmission capacity in at least the radiofrequency range, and a base ground layer co-extensive with the base layer; and
   the at least one transmitting interposer includes a transmitting substrate and a transmitting ground layer co-extensive with transmitting substrate, a dielectric layer adjacent to the transmitting ground layer, and a feed line adjacent to the dielectric layer.

6. The system of claim 5, further comprising:
   a plurality of interconnects configured to operatively connect the at least one transmitting interposer and the base board, the at least one transmitting interposer defining a first side and a second side; and
   wherein the plurality of transmitting patches of the transmitting antenna module is positioned on the first side of the at least one transmitting interposer and the transmitting front-end module is positioned on the second side of the at least one transmitting interposer;
   wherein the transmitting ground layer includes a respective aperture coupled to a respective one of the plurality of transmitting patches.

7. The system of claim 5, wherein:
   the plurality of interconnects is configured to directly connect the transmitting ground layer and the base ground layer.

8. The system of claim 1, wherein:
   the at least one receiving interposer includes a receiving substrate and a receiving ground layer co-extensive with receiving substrate, a dielectric layer adjacent to the receiving ground layer, the at least one receiving interposer defining a first side and a second side;
   the plurality of receiving patches of the receiving antenna module is positioned on the first side of the at least one receiving interposer and the receiving front-end module is positioned on the second side of the at least one receiving interposer; and
   the receiving ground layer includes a respective aperture coupled to a respective one of the plurality of receiving patches.

9. A method of controlling a radar system having a base board, the method comprising:
   operatively connecting at least one signal generator to the base board and configuring the at least one signal generator to generate an input signal at a first frequency, the first frequency being in a radiofrequency range;
   operatively connecting at least one transmitting interposer to the base board and configuring the at least one transmitting interposer to receive the input signal from the at least one signal generator;
   providing the at least one transmitting interposer with a transmitting front-end module configured to upconvert the input signal at the first frequency to an outgoing radar signal at a second frequency, the second frequency being greater than the first frequency;
   providing the at least one transmitting interposer with a transmitting antenna module having a plurality of transmitting patches configured to radiate the outgoing radar signal;
   operatively connecting at least one receiving interposer to the base board and configuring the at least one receiving interposer to transmit an output signal to the signal generator;

positioning the at least one signal generator between the at least one transmitting interposer and the at least one receiving interposer;

providing the at least one receiving interposer with a receiving antenna module having a plurality of receiving patches configured to capture an incoming radar signal at the second frequency; and providing the at least one receiving interposer with a receiving front-end module configured to downconvert the incoming radar signal at the second frequency to the output signal at the first frequency, the first frequency being between 20 GHz and 100 GHz and the second frequency being between 60 GHz and 300 GHz.

10. The method of claim 9, wherein:

the first frequency is between 70 GHz and 80 GHz and the second frequency is between 210 GHz and 240 GHz.

11. The method of claim 9, further comprising:

providing the transmitting front end module with a first local oscillator, a harmonic mixer and a first filter;

configuring the first local oscillator to produce a first local frequency;

configuring the harmonic mixer to produce a sum frequency and a difference frequency at a harmonic multiple of at least one of the first local frequency and the first frequency of the input signal; and configuring the first filter to remove at least one of the sum frequency and the difference frequency.

12. The method of claim 9, further comprising:

providing the receiving front end module with a second local oscillator, a second frequency mixer and a second filter;

configuring the second local oscillator to produce a second local frequency;

configuring the second frequency mixer to produce a sum frequency and a difference frequency from the second local frequency and the second frequency of the incoming radar signal; and configuring the second filter to remove at least one of the sum frequency and the difference frequency.

13. The method of claim 9, further comprising:

providing the base board with a base layer configured to have a transmission capacity in at least the radiofrequency range, and a base ground layer co-extensive with the base layer;

providing the at least one transmitting interposer with a transmitting substrate, a transmitting ground layer co-extensive with the transmitting substrate, a dielectric layer adjacent to the transmitting ground layer, and a feed line adjacent to the dielectric layer; and creating a respective aperture in the transmitting ground layer coupled to a respective one of the plurality of transmitting patches.

14. The method of claim 9, further comprising:

operatively connecting a plurality of interconnects to the at least one transmitting interposer and the base board, the at least one transmitting interposer defining a first side and a second side; and positioning the plurality of transmitting patches on the first side of the at least one transmitting interposer and positioning the transmitting front-end module on the second side of the at least one transmitting interposer.

15. The method of claim 14, further comprising:

directly connecting the plurality of interconnects to the transmitting ground layer and the base ground layer.

16. The method of claim 9, further comprising:

providing the at least one receiving interposer with a receiving substrate, a receiving ground layer co-extensive with a receiving substrate, and a dielectric layer adjacent to the receiving ground layer, the at least one receiving interposer defining a first side and a second side;

creating a respective aperture in the receiving ground layer coupled to a respective one of the plurality of receiving patches; and positioning the plurality of receiving patches on the first side of the at least one receiving interposer and positioning the receiving front-end module on the second side of the at least one receiving interposer.

* * * * *